United States Patent [19]
Cuddihy et al.

[11] Patent Number: 5,463,768
[45] Date of Patent: Oct. 31, 1995

[54] METHOD AND SYSTEM FOR ANALYZING ERROR LOGS FOR DIAGNOSTICS

[75] Inventors: Paul E. Cuddihy, Schenectady; Rasiklal P. Shah, Latham, both of N.Y.

[73] Assignee: General Electric Company, Schenectady, N.Y.

[21] Appl. No.: 214,266

[22] Filed: Mar. 17, 1994

[51] Int. Cl.⁶ ..................................................... G06F 11/00
[52] U.S. Cl. .................................. 395/183.13; 364/266.4; 364/413.13; 395/183.16
[58] Field of Search ........................ 371/19, 29.1, 16.5; 395/575, 500; 364/265, 266.6, 266.4, 267.7, 274.2, 274.3, 277

[56] References Cited

U.S. PATENT DOCUMENTS

| | | | |
|---|---|---|---|
| 5,036,514 | 7/1991 | Downes et al. | 371/29.1 |
| 5,119,377 | 6/1992 | Cobb et al. | 371/19 |
| 5,127,012 | 6/1992 | Hiliger | 371/29.1 |
| 5,239,547 | 8/1993 | Tomiyama et al. | 371/29.1 |

*Primary Examiner*—Vincent P. Canney
*Attorney, Agent, or Firm*—David C. Goldman; Paul R. Webb, II

[57] ABSTRACT

The present invention discloses an error log analysis system comprising a diagnostic unit and a training unit. The training unit includes a plurality of historical error logs generated during abnormal operation or failure from a plurality of machines, and the actual fixes (repair solutions) associated with the abnormal events or failures. A block finding unit identifies sections of each error log that are in common with sections of other historical error logs. The common sections are then labelled as blocks. Each block is then weighted with a numerical value that is indicative of its value in diagnosing a fault. In the diagnostic unit, new error logs associated with a device failure or abnormal operation are received and compared against the blocks of the historical error logs stored in the training unit. If the new error log is found to contain block(s) similar to the blocks contained in the logs in the training unit, then a similarity index is determined by a similarity index unit, and solution(s) is proposed to solve the new problem. After a solution is verified, the new case is stored in the training unit and used for comparison against future new cases.

22 Claims, 20 Drawing Sheets

MESG LOG OPENED : May 8, 1993 09:53:24

Code: LDSUMSG 1      Time: May 8, 1993 09:53:26
 Software revision 15. 0 is running under JEKGHEM Location = MNTL-011-GEN, SS= 1 OC FCO/HTD
ZIMEM HPR-I
 1 DISK SUP-A MAGTAP COMPRS CAMERA 3D Code: HDW4EOX 8     Time: May 8, 1993 09:55:51
 REGISTER1= 500 MESG= 4017

TABLE error encountered during xrays - TABLE
FRAME = 120200 (Octal)

Code: ERR27 1         Time: May 8, 1993 09:55:52
ERR27 MESG: FRAME=104000K FEDX=000000K
ES=000000K JRR= 1
CALLED FROM COMPONENT: 046136

Code: DOLOOP 1      Time: May 8, 1993 09:55:52
 Patient 4, PRS 1, Image 1, Image rel to series 1,
Queued 0
 REGISTER1 = 600 MESG = 4017

Code: HIKKUP27 1     Time: May 8, 1993 09:55:53
 REGISTER1 = 100 MESG = 4017

I/O SEMAPHORE: 101006 170011 (OCTAL) PROB
Code: 6 (DEC)

Code: SENDHALT 2    Time: May 8, 1993 09:55:53
 SENDHALT REPORTING: REGISTER1 = 1500
MESG = 4017

Fig. 2A

Code: 20058 6          Time: May 8, 1993 09:55:54
 C1 i/o status of 856 at Register1: 21340

Resolution Depth Error.

Code: ERR274 1          Time: May 8, 1993 09:55:55
ERR27 MESG: FRAME=104000K FEDX=000000K
ES=000000K JRR= 1
CALLED FROM COMPONENT: 044252

Code: HDFFS 5          Time: May 8, 1993 09:55:55
THE CONTROLLER ABORTED X-RAY, PLEASE
SEE CONTROLLER LOG FOR ADDITIONAL
DETAILS.

Code: HDW4EOX 8     Time: May 8, 1993 09:56:26
 REGISTER1= 500 MESG= 4017

TABLE error encountered during xrays - TABLE
FRAME = 120200 (Octal)

Code: ERR27 1          Time: May 8, 1993 09:56:27
ERR27 MESG: FRAME=104000K FEDX=000000K
ES=000000K JRR= 1
CALLED FROM COMPONENT: 046136

Code: DOLOOP 1       Time: May 8, 1993 09:56:27
 Patient 4, PRS 1, Image 1, Image rel to series 1,
Queued 0
 REGISTER1 = 600 MESG = 4017

Code: SENDHALT 2    Time: May 8, 1993 09:56:28
 SENDHALT REPORTING: REGISTER1 = 1500
MESG = 4017

Fig. 2B

Code: 20058 6          Time: May 8, 1993 09:56:29
C1 i/o status of 856 at Register1: 21340

Resolution Depth Error.

Code: ERR274 1         Time: May 8, 1993 09:56:30
ERR27 MESG: FRAME=104000K FEDX=000000K
ES=000000K JRR= 1
CALLED FROM COMPONENT: 044252

Code: HDFFS 5          Time: May 8, 1993 09:56:31
THE CONTROLLER ABORTED X-RAY, PLEASE
SEE CONTROLLER LOG FOR ADDITIONAL
DETAILS.

Code: HDW4EOX 8    Time: May 8, 1993 09:56:59
 REGISTER1= 500 MESG= 4017

TABLE error encountered during xrays - TABLE
FRAME = 120200 (Octal)

Code: ERR27 1          Time: May 8, 1993 09:57:00
ERR27 MESG: FRAME=104000K FEDX=000000K
ES=000000K JRR= 1
CALLED FROM COMPONENT: 046136

Code: DOLOOP 1     Time: May 8, 1993 09:57:00
 Patient 4, PRS 1, Image 1, Image rel to series 1,
Queued 0
 REGISTER1 = 600 MESG = 4017

Code: HIKKUP27 1    Time: May 8, 1993 09:57:01
 REGISTER1 = 100 MESG = 4017

Fig. 2C

```
I/O SEMAPHORE: 101006 170011 (OCTAL) PROB
Code: 6 (DEC)

Code: SENDHALT 2    Time: May 8, 1993 09:57:01
 SENDHALT REPORTING: REGISTER1 = 1500
MESG = 4017

Code: 20058 6       Time: May 8, 1993 09:57:02
 C1 i/o status of 856 at Register1: 21340

Resolution Depth Error.

Code: ERR274 1      Time: May 8, 1993 09:57:03
ERR27 MESG: FRAME=104000K FEDX=000000K
ES=000000K JRR= 1
CALLED FROM COMPONENT: 044252

Code: HDFFS 5       Time: May 8, 1993 09:57:04
THE CONTROLLER ABORTED X-RAY, PLEASE
SEE CONTROLLER LOG FOR ADDITIONAL
DETAILS.
```

```
<error_code> LDSUMSG
<time> 736869206
<timestring> Sat May 8 09:53:26 1993
<code> 1

<error_code> HDW4EOX
<time> 736869351
<timestring> Sat May 8 09:55:51 1993
<jrr> 4017
<code> 8

<error_code> ERR27
<time> 736869352
<timestring> Sat May 8 09:55:52 1993
<jrr> 1
<code> 1
<frame> 104000K
<fedx> 000000K
<es> 000000K
<component> 046136

<error_code> DOLOOP
<time> 736869352
<timestring> Sat May 8 09:55:52 1993
<jrr> 4017
<code> 1

<error_code> HIKKUP27
<time> 736869353
<timestring> Sat May 8 09:55:53 1993
<jrr> 4017
<code> 1
<io_sem_oct> 101006 170011
```

Fig. 3A

```
<error_code> SENDHALT
<time> 736869353
<timestring> Sat May 8 09:55:53 1993
<jrr> 4017
<code> 2

<error_code> 20058
<time> 736869354
<timestring> Sat May 8 09:55:54 1993
<register1> 21340
<code> 6

<error_code> ERR274
<time> 736869355
<timestring> Sat May 8 09:55:55 1993
<jrr> 1
<code> 1
<frame> 104000K
<fedx> 000000K
<es> 000000K
<component> 044252

<error_code> HDFFS
<time> 736869355
<timestring> Sat May 8 09:55:55 1993
<code> 5

<error_code> HDW4EOX
<time> 736869386
<timestring> Sat May 8 09:56:26 1993
<jrr> 4017
<code> 8

<error_code> ERR27
<time> 736869387
```

Fig. 3B

```
<timestring> Sat May 8 09:56:27 1993
<jrr> 1
<code> 1
<frame> 104000K
<fedx> 000000K
<es> 000000K
<component> 046136

<error_code> DOLOOP
<time> 736869387
<timestring> Sat May 8 09:56:27 1993
<jrr> 4017
<code> 1

<error_code> SENDHALT
<time> 736869388
<timestring> Sat May 8 09:56:28 1993
<jrr> 4017
<code> 2

<error_code> 20058
<time> 736869389
<timestring> Sat May 8 09:56:29 1993
<register1> 21340
<code> 6

<error_code> ERR274
<time> 736869390
<timestring> Sat May 8 09:56:30 1993
<jrr> 1
<code> 1
<frame> 104000K
<fedx> 000000K
<es> 000000K
<component> 044252
```

Fig. 3C

```
<error_code> HDFFS
<time> 736869391
<timestring> Sat May 8 09:56:31 1993
<code> 5

<error_code> HDW4EOX
<time> 736869419
<timestring> Sat May 8 09:56:59 1993
<jrr> 4017
<code> 8

<error_code> ERR27
<time> 736869420
<timestring> Sat May 8 09:57:00 1993
<jrr> 1
<code> 1
<frame> 104000K
<fedx> 000000K
<es> 000000K
<component> 046136

<error_code> DOLOOP
<time> 736869420
<timestring> Sat May 8 09:57:00 1993
<jrr> 4017
<code> 1

<error_code> HIKKUP27
<time> 736869421
<timestring> Sat May 8 09:57:01 1993
<jrr> 4017
<code> 1
<io_sem_oct> 101006 170011
```

Fig. 3D

```
<error_code> SENDHALT
<time> 736869421
<timestring> Sat May 8 09:57:01 1993
<jrr> 4017
<code> 2

<error_code> 20058
<time> 736869422
<timestring> Sat May 8 09:57:02 1993
<register1> 21340
<code> 6

<error_code> ERR274
<time> 736869423
<timestring> Sat May 8 09:57:03 1993
<jrr> 1
<code> 1
<frame> 104000K
<fedx> 000000K
<es> 000000K
<component> 044252

<error_code> HDFFS
<time> 736869424
<timestring> Sat May 8 09:57:04 1993
<code> 5
```

Fig. 3E

| error_code | code | register1 | jrr | component | io_sem_oct |
|---|---|---|---|---|---|
| LDSUMSG | 1 | | | | |
| HDW4EOX | 8 | | 4017 | 046136 | |
| ERR27 | 1 | | 1 | | |
| DOLOOP | 1 | | 4017 | | |
| HIKKUP27 | 1 | | 4017 | | 101006 170011 |
| SENDHALT | 2 | | 4017 | | |
| 20058 | 6 | 21340 | | | |
| ERR274 | 1 | | 1 | 044252 | |
| HDFFS | 5 | | | | |
| HDW4EOX | 8 | | 4017 | 046136 | |
| ERR27 | 1 | | 1 | | |
| DOLOOP | 1 | | 4017 | | |
| SENDHALT | 2 | | 4017 | | |
| 20058 | 6 | 21340 | | | |
| ERR274 | 1 | | 1 | 044252 | |
| HDFFS | 5 | | | | |
| HDW4EOX | 8 | | 4017 | 046136 | |
| ERR27 | 1 | | 1 | | |
| DOLOOP | 1 | | 4017 | | |
| HIKKUP27 | 1 | | 4017 | | 101006 170011 |

Fig. 4A

| error_code | code | register1 | jrr | component | io_sem_oct |
| --- | --- | --- | --- | --- | --- |
| SENDHALT | 2 | | 4017 | | |
| 20058 | 6 | 21340 | | | |
| ERR274 | 1 | | 1 | 044252 | |
| HDFFS | 5 | | | | |

Fig. 4B

LOG 1

| | | | | | |
|---|---|---|---|---|---|
| LDBLDA | 65534 | 282 | 20 | | |
| HSRVR | 7 | | 8010 | | 8 |
| HSRVR | 5 | | 9101 | | |
| HSRVR | 9 | | 9050 | 99 | 9101 |
| GTSM | 2 | 7000 | 700 | | |
| GTSM | 4 | | | 0 | 486 | 32 |
| LOOP | 65534 | 7000 | 1800 | | |
| LOOP | 65534 | -1 | 6300 | | |
| HSRVR | 7 | | 8010 | | 8 |
| HSRVR | 5 | | 9101 | | |
| GTSM | 4 | | | 0 | 486 | 32 |
| LOOP | 65534 | 7000 | 1800 | | |
| HSRVR | 9 | | 9050 | 99 | 9101 |
| GTSM | 2 | 7000 | 700 | | |
| GTSM | 4 | | | 0 | 486 | 32 |
| LOOP | 65534 | 7000 | 1800 | | |
| LOOP | 65534 | -1 | 6300 | | |
| REPRI | 5 | | | | |
| REPRI | 6 | | 360 | | |
| HSRVR | 7 | | 8010 | | 8 |
| HSRVR | 5 | | 9101 | | |
| HSRVR | 9 | | 9050 | 99 | 9101 |
| GTSM | 2 | 7000 | 700 | | |
| LOOP | 65534 | 7000 | 1800 | | |
| HSRVR | 5 | | 9101 | | |
| GTSM | 4 | | | 0 | 486 | 32 |
| MERR1 | 1 | 13 | | | |
| LDDIDAS | 1 | 13 | 300 | | |
| ERROR3 | 1 | 13 | | | |
| LDDITGC | 1 | 13 | 10 | | |
| MGERR | 1 | 16 | | | |
| TUBECON | 8 | 16 | 100 | | |
| LDDITCL | 65534 | 16 | 10 | | |

LOG 2

| | | | | | |
|---|---|---|---|---|---|
| ERROR3 | 1 | 13 | | | |
| TUBECON | 8 | 16 | 100 | | |
| MERR1 | 1 | 13 | | | |
| LDDIDAS | 1 | 13 | 300 | | |
| ERROR3 | 1 | 13 | | | |
| LDDITGC | 1 | 13 | 10 | | |
| MGERR | 1 | 16 | | | |
| TUBECON | 8 | 16 | 100 | | |
| LDDITCL | 65534 | 16 | 10 | | |
| LDBLDA | 65534 | 0 | 20 | | |
| HSRVR | 7 | | 8010 | | 8 |
| HSRVR | 5 | | 9101 | | |
| HSRVR | 9 | | 9050 | 99 | 9101 |
| GTSM | 2 | 7000 | 700 | | |
| GTSM | 4 | | | 0 | 486 | 32 |
| LOOP | 65534 | 7000 | 1800 | | |
| LOOP | 65534 | -1 | 6300 | | |
| HSRVR | 7 | | 8010 | | 8 |
| HSRVR | 5 | | 9101 | | |
| HSRVR | 9 | | 9050 | 99 | 9101 |
| GTSM | 2 | 7000 | 700 | | |
| GTSM | 4 | | | 0 | 486 | 32 |
| LOOP | 65534 | 7000 | 1800 | | |
| LOOP | 65534 | -1 | 6300 | | |
| REPRI | 5 | | | | |
| REPRI | 6 | | 360 | | |
| HSRVR | 7 | | 8010 | | 8 |
| HSRVR | 5 | | 9101 | | |
| HSRVR | 9 | | 9050 | 99 | 9101 |
| GTSM | 2 | 7000 | 700 | | |
| GTSM | 4 | | | 0 | 486 | 32 |
| LOOP | 65534 | 7000 | 1800 | | |
| HSRVR | 7 | | 8010 | | |

(Regions labeled A, B, C)

Fig. 7B

METHOD AND SYSTEM FOR ANALYZING ERROR LOGS FOR DIAGNOSTICS

BACKGROUND OF THE INVENTION

1. Field of the Invention

The present invention relates generally to the diagnostics of machine malfunctions and more particularly to the automated derivation of repair recommendations through analysis of error logs generated from malfunctioning machines.

2. Description of the Related Art

In either an industrial or commercial setting, a machine malfunction can impair a business severely. Thus, it is essential that a malfunctioning machine be repaired quickly and accurately. Usually, during a malfunction of a machine (i.e. any mechanical, chemical, electronic, or micro-processor controlled device), a field engineer is called in to diagnose and repair the device. Typically, the field engineer will look at an error log generated from the machine, which contains sequences of events that occurred during both routine operation as well as during any malfunction situation. The error log represents a "signature" of the, operation of the machine and can be used to correlate malfunctions. Using their accumulated experiences at solving machine malfunctions, the field engineer looks through the error log and tries to find any symptoms that may point to the fault. Then the field engineer will try to correct the problem that may be causing the machine malfunction. If the error log contains only a small amount of error log information, this process will work fairly well. However, if the error log contains a large amount of imprecise information as is usually the case for large complex devices, it will be very difficult for the field engineer to diagnose a fault.

In order to overcome the problems associated with evaluating large amounts of data in error logs, diagnostic expert systems have been put into use. Diagnostic expert systems are developed by interviewing field engineers to determine how they go about fixing a machine malfunction. From the interview, rules and procedures are formulated and stored in a repository, taking the form of either a rule base or a knowledge base. The rule or knowledge base is implemented with a rule interpreter or a knowledge processor to form the diagnostic expert system. In operation, the rule interpreter or knowledge processor is used to quickly find needed information in the rule or knowledge base to evaluate the operation of the malfunctioning machine and provide guidance to a field engineer. Problems associated with conventional diagnostic expert systems are that these systems are limited to the rules or knowledge stored in the repository, knowledge extraction from experts is time consuming, error prone and expensive, rules are brittle and cannot be updated easily. In order to update the diagnostic expert system, the field engineers have to be continually interviewed so that the rules and premiums can be reformulated.

Other diagnostic systems have used artificial neural networks to correlate data in order to diagnose machine faults. An artificial neural network typically includes a number of input terminals, a layer of output nodes, and one or more "hidden" layers of nodes between the input and output nodes. Each node in each layer is connected to one or more nodes in the preceding or following layer, possibly to an output terminal, and possibly to one or more input terminals. The connections are via adjustable-weight links analogous to variable-coupling strength neurons. Before being placed in operation, the artificial neural network must be trained by iteratively adjusting the connection weights and offsets, using pairs of known input and output data, until the errors between the actual and known outputs are acceptably small. A problem with using an artificial neural network for diagnosing machine malfunctions, is that the neural network does not produce explicit fault correlations that can be verified by experts and adjusted if desired. In addition, the conventional steps of training an artificial neural network do not provide a measure of its effectiveness so that more data can be added if necessary. Also, the effectiveness of the neural network is limited and does not work well for large number of variables.

Other diagnostic expert systems have used case-based reasoning to diagnose faults associated with malfunctioning machines. Case-based diagnostic systems use a collection of data known as historical cases and compare it to a new set of data, a case, to correlate data for diagnosing faults. A problem associated with using case-based reasoning is that it is effective for small sets of data containing well defined pars_meters. It is very difficult for a case-based diagnostic system to boil down large, nearly free-form input data and extract important parameters therefrom.

SUMMARY OF THE INVENTION

Therefore, it is a primary objective of the present invention to provide an error log analysis system that automatically generates diagnostic knowledge without the dependence of human experts such as field engineers.

Another object is to provide an error log analysis system that learns from the error log cases that have been analyzed and automatically updates the system in accordance with what it has learned.

Still another object is to provide a flexible error log analysis system that accepts error logs with large amounts of data and provides the best diagnosis as well as alternatives.

Another object is to create blocks representing important features abstracted from an arbitrarily large collection of data in the error logs and parse the data into parameters that are used for diagnosing a fault.

Yet another object is to provide an explicit fault correlation of data that can verified by experts and adjusted if desired.

Thus, in accordance with the present invention, there is provided an error log analysis system for analyzing an error log generated from a malfunctioning machine. The error log analysis system includes means for storing a plurality of historical error logs generated from a plurality of malfunctioning machines. Each of the plurality of historical error logs contain data representative of events occurring at the plurality of malfunctioning machines. The plurality of historical error logs are grouped into case sets of common malfunctions. A receiving means receives a new error log from a malfunctioning machine. The new error log contains data representative of events ocurring at the malfunctioning machine. A comparing means compares the new error log to the plurality of historical error logs. The comparing means locates sections of data in the new error log that are common to sections of data in each of the case sets defined from the plurality of historical error logs. A predicting means predicts which of the common sections of data are indicative of a particular malfunction.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

BRIEF DESCRIPTION OF THE DRAWINGS

FIGS. 2A–2D are partial views of the error log shown in FIG. 2;

FIG. 3 is an illustration of a parsed error log

FIGS. 3A–3E are partial views of the parsed error log shown in FIG. 3;

FIGS. 4A–4B are partial views of the columnized error log shown in FIG. 4;

FIGS. 7A–7B are partial views of the error logs shown in FIG. 7.

DETAILED DESCRIPTION OF THE PRESENT INVENTION

The error log analysis system of the present invention will be described in reference to a medical imaging device. Although the preferred embodiment of the present invention is described in reference to a medical imaging device, the error log analysis system can be used in conjunction with any device (chemical, mechanical, electronic, microprocessor controlled) which generates and stores error log messages or parameter values describing the device operation.

Figure 1:
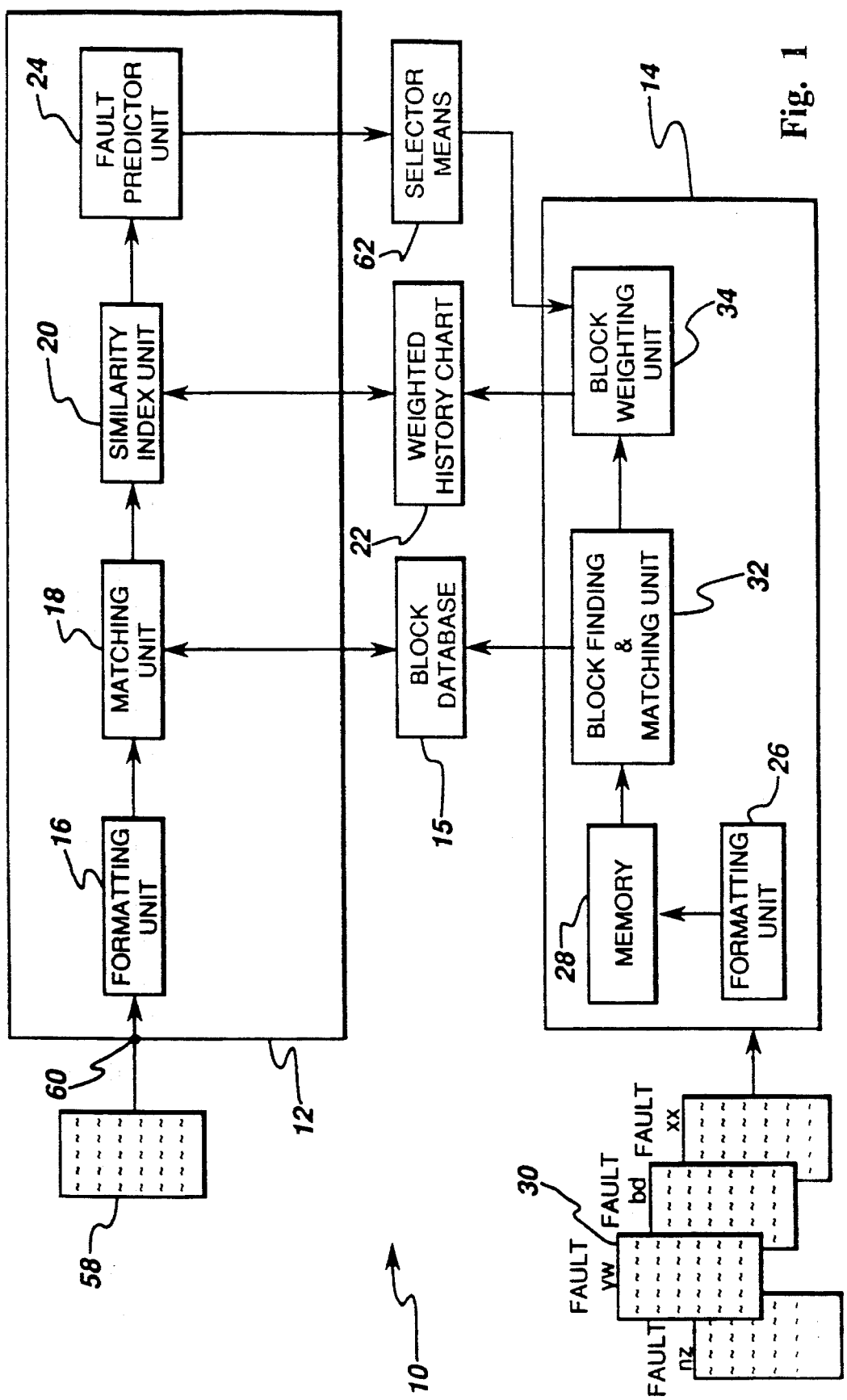
FIG. 1 is block diagram of the present invention.

FIG. 1 shows a block diagram of an error log analysis system 10 embodied in the present invention. The error log analysis system includes a diagnostic unit 12, a training unit 14, a block database 15, a weighted history chart 22, and a selector means 62. The diagnostic unit includes a formatting unit 16, a matching unit 18, a similarity index unit 20, and a fault predicting unit 24. The training unit includes a formatting unit 26, a memory 28 containing a plurality of error logs 30, a block finding and matching unit 32, and a block weighting unit 34.

Figure 2:
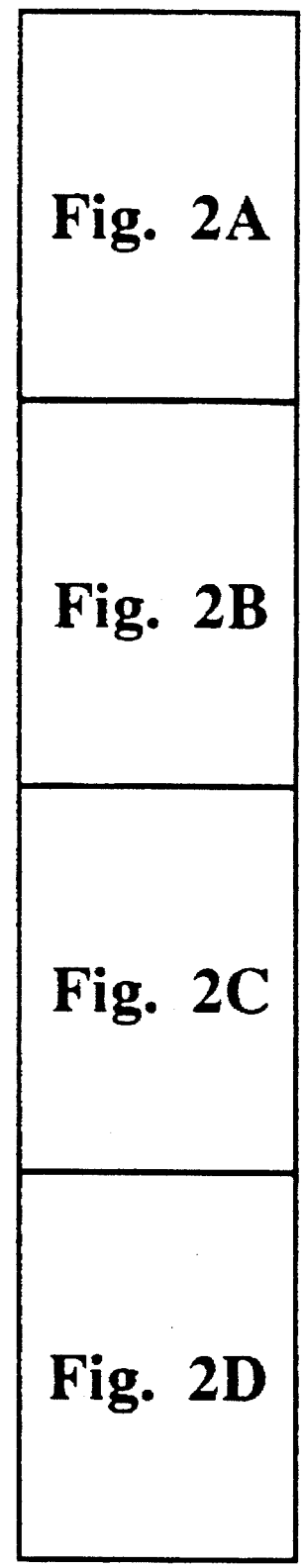
FIG. 2 is an illustration an error log

The training unit 14 receives the plurality of error logs from various imaging devices located at different locations. The error logs for the training unit may be derived from a variety of sources, depending on the development stage of this diagnostic system. The sources include: field repair sites, central repair facility, quality control testing laboratories, etc. The plurality of error logs are then used as historical cases documenting software and hardware errors occurring at the different machines. Each of the error logs has a corresponding malfunction description (i.e. fault nz, yw, bd, etc.) associated with it. A typical error log generated from a computerized tomography machine such as a GE CT 9800, contains many megabytes of loosely formatted information. Each message in an error log contains one to a dozen different values, resulting in thousands of values throughout the log. An example of an error log is shown in FIG. 2 with its detailed partial views shown in FIGS. 2A–2D. Most of the data in the error log is irrelevant and includes such information as dates, times and English comments. The dates from each imaging device will vary from machines.

While the error log in FIGS. 2A–2D is shown with discrete values, other devices that generate continuous variables are within the scope of the present invention. Continuous variables such as pressure, temperature, or speed derived from a mechanical device can be further classified into a finite set of discrete variables and classified as a member of a quantile (i.e. 4 member classes) or a decile (i.e. 10 member classes) set.

Figures 3, 3A, 3B, 3C, 3D, 3E:
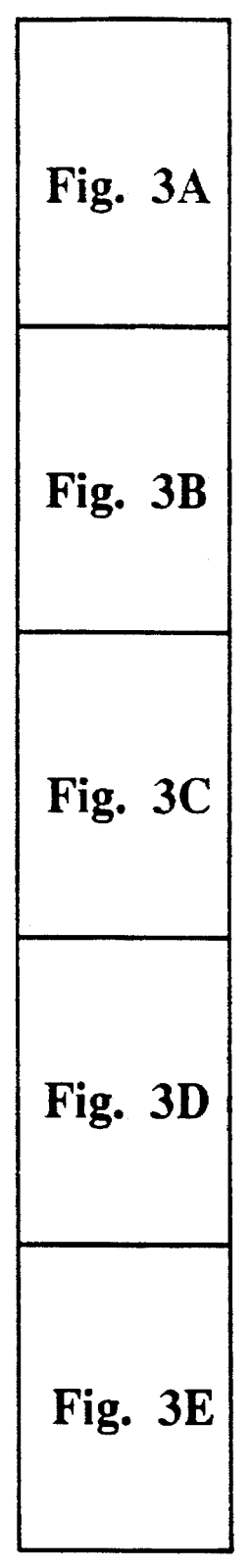
Figure 4:
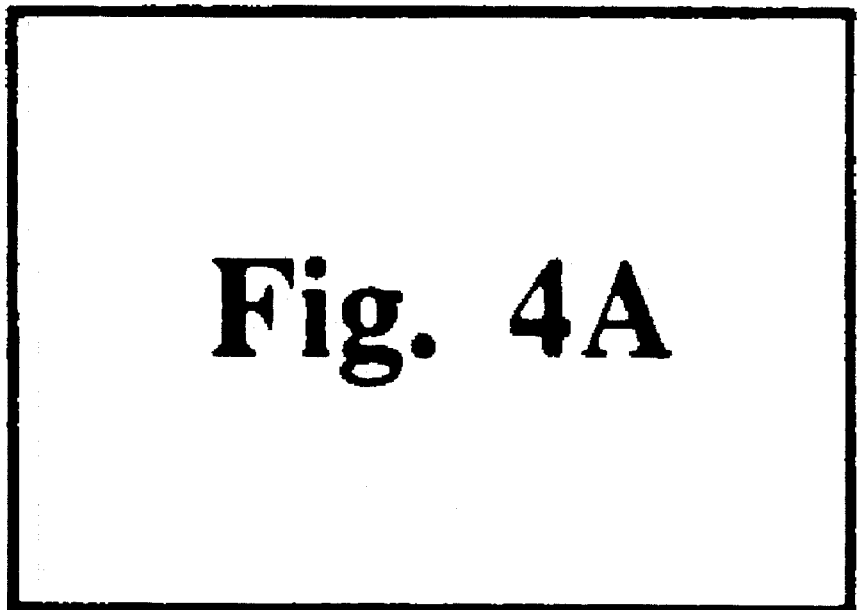
FIG. 4 is an illustration of a parsed error log in a columnized format.
Figure 4:
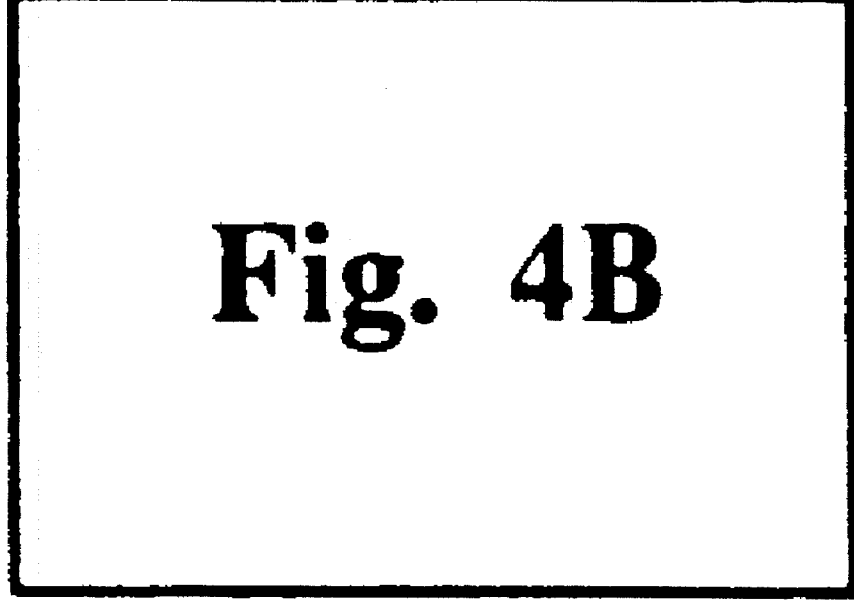

In order to remove extraneous data, the error logs are formatted into a similar arrangement. The formatting unit 26 formats data, removes irrelevant information (i.e. dates and sequence numbers), resolves inconsistencies and simplifies values. The error log is formatted by parsing the data into lists of expressions and field names. A parsed error log is shown in FIG. 3 with its detailed partial views shown in FIGS. 3A–3E. In this example, each value is put on a separate line with a label enclosed in brackets (i.e. <>) and each message is separated by a blank line. After parsing into a common format, irrelevant information such as dates, times, and English-language comments are filtered out and the essential information is put in a columnized format as shown in FIG. 4, with its detailed partial views shown in FIGS. 4A–4B.

Although the above steps of formatting are preferred, it is within the scope of the present invention to delete only a few items from the error logs such as site location, date, or time and leave the remaining information in the error log. Parsing and columnizing depend on how significant the data is to diagnosing a malfunction. Thus, whether to use or not use parsing or columnizing depends on the user.

Figure 5A:
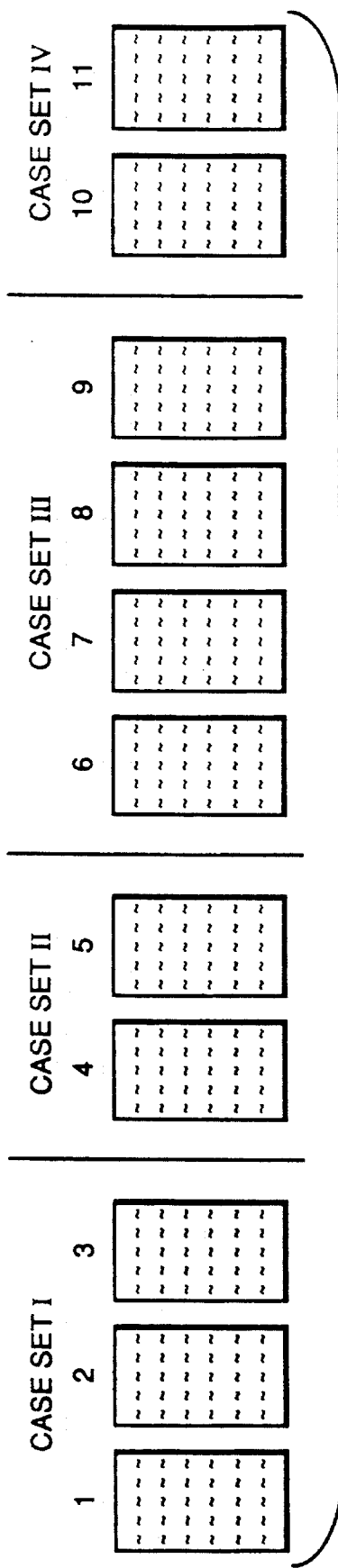
FIGS. 5A–5B show schematics of error logs grouped into case sets with blocks of data.

After formatting, each of the plurality of error logs 30 are grouped in the block finding and matching unit 32 into case sets of common symptoms or common corrective actions (i.e. faulty parts, boards, caches, etc.). FIG. 5A shows error logs 1–11 grouped into case sets, wherein error log cases 1–3 are grouped into case set I; error log cases 4–5 into case set II; error log cases 6–9 into case set III; and error log cases 10–11 into case set IV. A case is represented by one or more error logs and a fix associated with a single malfunction of a device. A case set consists of all historical cases having the same fix.

Figure 5B:
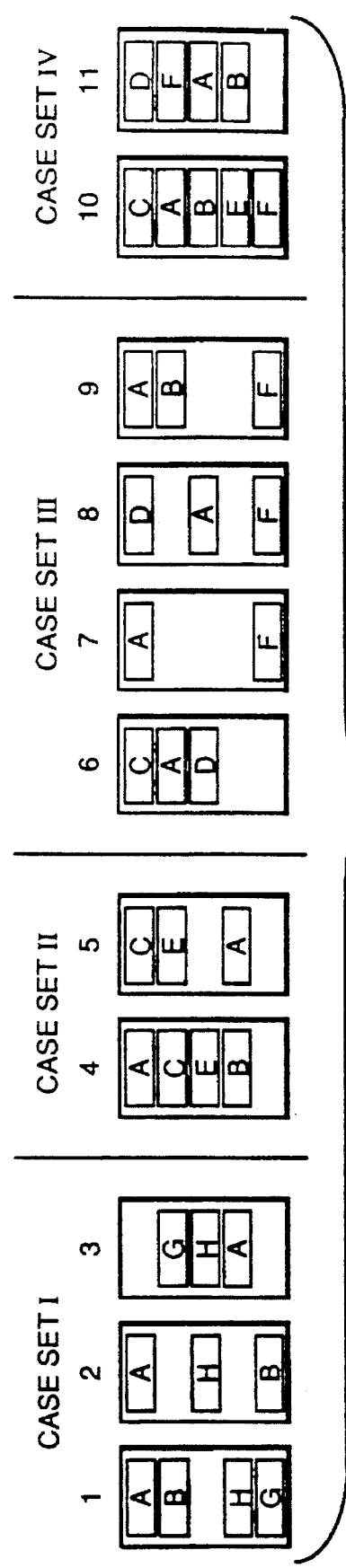

After the error logs have been grouped into cases and case sets, the error logs in each case set are examined to identify common patterns of data. The common patterns are then labelled as blocks. A block consists of consecutive row(s) of data in a data file such as represented by FIGS. 4A–4B derived from a historical error log file that exists in at least one or more cases. FIG. 5B shows the error logs in case set I having blocks A, B, G and H; the error logs in case set II having blocks A, B, C and E; the error logs in case set III having blocks A, B, C, D, and F; and the error logs in case set IV having blocks A, B, C, D, E, and F. After blocks in each case set have been identified, the blocks of each case set are compared to identify common blocks. After comparison, the blocks are stored in the block database 15 and are used to characterize fault contribution for new error logs that are received in the diagnostic unit 12.

Figure 6:
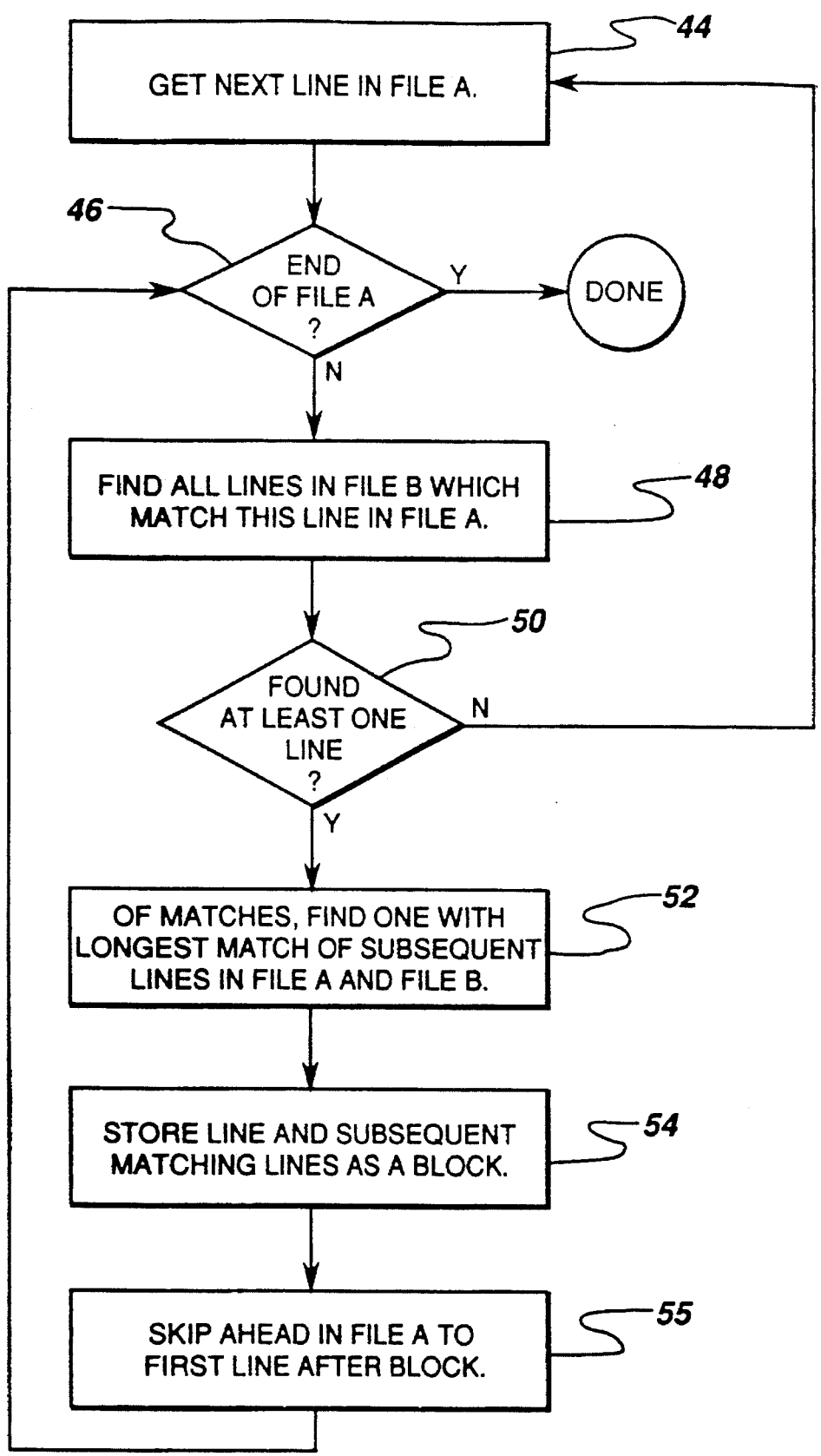
FIG. 6 is a flow chart depicting the steps taken to find and match blocks between error logs.

The step of block finding is performed by matching strings of data from each of the plurality of error logs and is detailed in the flow chart of FIG. 6. In step 44, a line from a first error log A is read. If the line that is read from error log A is not the last line at 46, then all lines in a second error log B that match the line read in error log A are found at 48. If there is a match of at least one line at 50, then each match is searched at 52 to see how many subsequent lines match.

Figure 7:
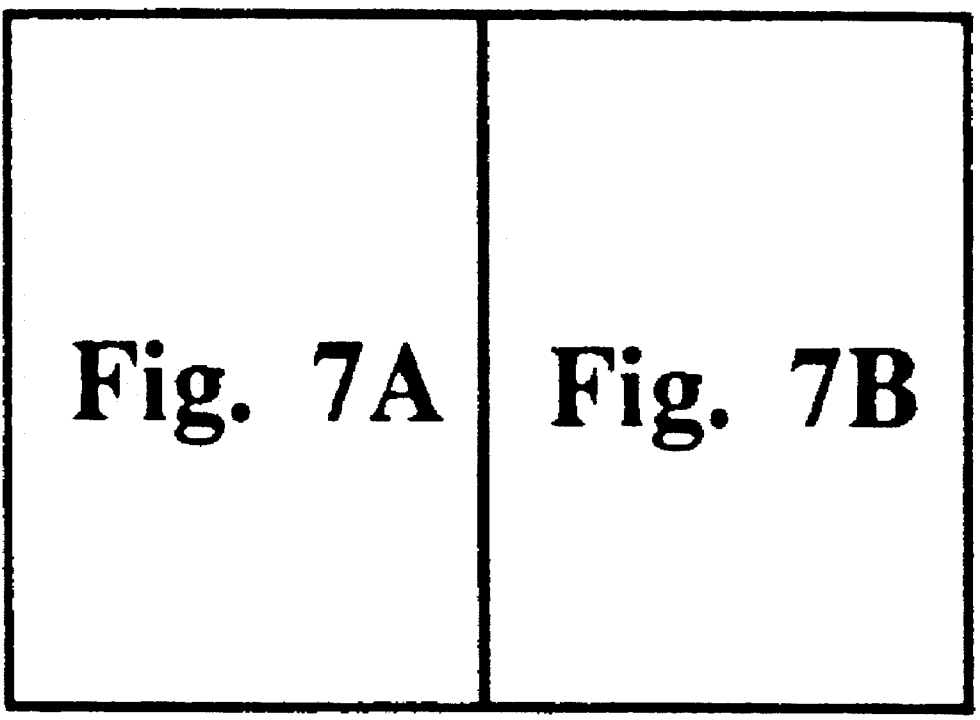
FIG. 7 is an example of error logs having common blocks.

The longest sequence of matching lines is then stored as a block at 54. After finding a match, the error log A is skipped ahead at 55 to the first line after the matching block. Skipping ahead after finding a match, prevents a match of every possible subset of a block. Only those subsets which actually appear in different places in the inputted error logs are matched. These steps are continued until all of the lines of the plurality of error logs in each case set have been read. An example of two error logs showing matched blocks is shown in FIG. 7, with its detailed partial views shown in FIGS. 7A–7B. In particular, FIGS. 7A–7B shows three matched blocks A, B, and C.

Once the common blocks have been identified, the weighting unit 34 assigns a quantitative weight value to each of the blocks in the case sets in accordance with their diagnostic significance. For example, a block which occurs in one case set, but not necessarily in every case of the case set is considered a unique block. A unique block is assigned a higher weight value, because it is a reliable predictor of a malfunction. Conversely, a block which appears in many case sets has no diagnostic significance and is assigned a lower weight value (i.e. 0).

In the preferred embodiment of the present invention, blocks which appear in more than one case set are assigned weights according to an exponential curve. Exponential weighting is based on two premises, first, blocks appearing in fewer cases are better predictors and, second, weaker predictors are not allowed to "out-vote" stronger predictors. In order to implement the exponential weighting scheme, blocks are grouped into their respective case sets as shown in FIGS. 5A–5B. Unique blocks are assigned a higher weight and blocks of each subsequent lower block are assigned a lower weight with a weight a zero being assigned to blocks appearing in every case set. Assigning weights on an exponential curve ensures that strong blocks are not overpowered by weaker blocks. For example, a factor of two indicates that unique blocks are twice as strong as blocks occurring in two case sets. A factor of four indicates that unique blocks are four times as strong as blocks occurring in three case sets.

An important consideration in using the exponential weighting scheme is the integer capability of a typical microprocessor used for hardware implementation of this invention, and therefore, the weights should not be greater than the microprocessor's maximum integer. In order to prevent such an integer overflow condition, the scheme must check the number of cases at each weight level, then adjust the "weighting factor" so that it is small enough that the sum of all weights is within the integer capability of a microprocessor. One strategy for assigning the block weights is given by the following formula listed in equation 1, in which a value of 3 is used for the sake of an example as the base of the exponent:

$$w_i = 3^{(m-n_i-1)}, \quad (1)$$

wherein $w_i$ = weight of block i m = maximum number of case sets $n_i$ = number of case sets in which block i occurs For those blocks occurring in every set (i.e. $m=n_i$):

assign $w_i=0$

This equation prevents weaker blocks from "out voting" the stronger blocks by assigning zero weights to blocks appearing in all case sets and weights of one to blocks appearing in one less than all case sets.

After all of the blocks have been assigned a numerical weight using the exponential weighting scheme set forth in equation 1, a weighted historical chart is prepared and stored in the weighted history chart 22. Table 1 shows an example of a weighted historical chart that has been formulated by using an exponential weighting factor of 3. In Table 1, there are eight blocks A–H arranged in order of diagnostic value for error log cases 1–11. Case sets are shown with thick vertical lines. For example, error log cases 1–3 are one case set, error log cases 4–5 are a second case set, error log cases 6–9 are a third case set, and error log cases 10–11 are a fourth case set. Blocks A and B occur in every case set and are given a weight of zero, which essentially discards them from being used as a diagnostic predictor. It does not matter that block A occurs more often than block B. Only the number of case sets that the blocks occur in is considered. Block C occurs in three of the four case sets and is assigned a weight of one. Blocks D–F occur in only two case sets and are given a weight of three (3 x exponent (1), see equation 1). Blocks G–H occur in only one case set and are assigned a weight of nine (3 x exponent (2), see equation 1).

TABLE 1

| Block Name | Weight | 1 | 2 | 3 | 4 | 5 | 6 | 7 | 8 | 9 | 10 | 11 |
|---|---|---|---|---|---|---|---|---|---|---|---|---|
| Block A | 0 | A | A | A | A | A | A | A | A | A | A | A |
| Block B | 0 | B | B |   | B |   |   |   |   |   | B | B | B |
| Block C | 1 |   |   |   | C | C | C |   |   | C |   |   |
| Block D | 3 |   |   |   |   |   | D |   | D |   |   | D |
| Block E | 3 |   |   |   | E | E |   |   |   |   | E |   |
| Block F | 3 |   |   |   |   |   |   | F | F | F | F | F |
| Block G | 9 | G |   | G |   |   |   |   |   |   |   |   |
| Block H | 9 | H | H | H |   |   |   |   |   |   |   |   |

After the blocks have been identified, they are stored in database 15 and used to correlate a fault associated with a new error log 58. The new error log is inputted at the diagnostic unit 12 at an input terminal 60. The new error log is formatted (i.e. parsed and columnized) at the formatting unit 16. Afar the input error log has been processed into a standard format, the error log is sent to the matching unit 18, where it is searched for the blocks of data stored in the database 15. The block matching unit identifies any known blocks. The step of block finding is identical to the step described above for the block matching unit 32.

The similarity index unit 20 uses the weighted historical chart to calculate a similarity index which is a measure of how similar two error logs are to each other. Or, more specifically, how similar the input error log 58 of the new case is to any of the error logs of the cases in 30 used for training. The similarity index value for the two cases represents the fraction of the cases" blocks which match each other. It is derived by calculating the sum of weights of all blocks in a new case a; a sum of weights of all blocks in another case b; and the sum of weights of blocks shared by case a and case b. For each case, the shared blocks are divided by the total blocks of the case arriving at the fraction of the case's blocks which match the other case and then are multiplied. This calculation is shown in equation 2 which is set forth below:

$$\frac{\sum_{i=\text{case}(a \cap b)} \text{weight}(\text{block}_i)}{\sum_{i=\text{case}(a)} \text{weight}(\text{block}_i)} \times \frac{\sum_{i=\text{case}(a \cap b)} \text{weight}(\text{block}_i)}{\sum_{i=\text{case}(b)} \text{weight}(\text{block}_i)} \quad \text{Equation 2:}$$

The resulting value from equation 2 is a number between zero and one. A similarity of one means that the weighted blocks of the two logs are identical (i.e the total blocks weight and shared blocks weight for each are equal). If none of the blocks match between the two cases then the shared blocks weights will be zero for one case, resulting in a similarity index of zero. If every block in case a matches case b, but the matching blocks only represent haft of case b's total blocks weights, then the similarity index is 0.5 (1×0.5). If half of case a's blocks match block b's, and the matching blocks also represent only half of blocks b's total blocks weights, then the similarity index is 0.25 (0.5×0.5). Thus, the highest similarity indices are generated when the most diagnostically significant blocks from each case match those in other cases. If one case has heavily weighted blocks which do not appear in the other case, the similarity index is lower. If both cases have many blocks which do not match the other, then the similarity index is lower.

After all of the similarity indexes have been calculated, the similarity index unit 20 puts the indexes into a similarity index and diagnosis chart. An example of a similarity index and diagnosis chart of the weights provided in Table 1 is shown in Table 2 below:

TABLE 2

| Block Name | Weight | 1 | 2 | 3 | 4 | 5 | 6 | 7 | 8 | 9 | 10 | 11 | New Case |
|---|---|---|---|---|---|---|---|---|---|---|---|---|---|
| Block A | 0 | A | A | A | A | A | A | A | A | A | A | A | A |
| Block B | 0 | B | B |   | B |   |   |   |   | B | B | B |   |
| Block C | 1 |   |   |   | C | C | C |   |   |   | C |   | C |
| Block D | 3 |   |   |   |   |   | D |   | D |   |   | D |   |
| Block E | 3 |   |   |   | E | E |   |   |   |   | E |   | E |
| Block F | 3 |   |   |   |   |   |   | F | F | F | F | F | F |
| Block G | 9 | G |   | G |   |   |   |   |   |   |   |   |   |
| Block H | 9 | H | H | H |   |   |   |   |   |   |   |   |   |
| Total Weight | — | 18 | 9 | 18 | 4 | 4 | 4 | 3 | 6 | 3 | 7 | 6 | 7 |
| Shared Weight | — | 0 | 0 | 0 | 4 | 4 | 1 | 3 | 3 | 3 | 7 | 3 | 7 |
| Similarity Index | — | 0 | 0 | 0 | .57 | .57 | .04 | .43 | .21 | .43 | 1.0 | .21 | (1) |

In Table 2, the new error log case 58 (blocks A, C, E, and F) is shown in comparison to the historical error log cases. Also shown is the total weights of the blocks in each case, the total weight of blocks shared with the new case, and the similarity index between each historical case and the new case.

The fault predictor unit 24 uses the similarity index and diagnosis chart to find the case in the chart whose blocks best match the error log 58 of the new case being diagnosed. The fault(s) associated with the case(s) found are then considered diagnoses of the malfunction represented by the new error log 58. Case 10 is a perfect match to the new error log case and it is likely that case 10's diagnosis is applicable to the new case. Note that this diagnosis is derived by the system proposed by this invention even though the logs for case 10 and the new case in Table 2 are not identical, i.e. block B of case 10 is not found in the log for the new case. If by chance, the solution for case 10 does not fix the new case, then the next best solution is tried (i.e. cases 4–5, then 7 or 9). Generally, the fix associated with the most similar error log should be used first and if that does not work, the next best error logs are used until the problem is solved.

After the fault predicting unit 24 finds an applicable solution, a selector means 62 decides whether the new error log case 58 should be added to the historical cases for use in diagnosing future malfunctions or discarded. In the present invention, the selector means adds cases to increase its accuracy in diagnosing future malfunctions. Eventually, as more cases are added, the system's level of accuracy will even out and then it becomes necessary to stop adding new cases to the training unit. The selector means adds new cases by a clustering scheme that groups similar cases together and determines how well the cases fall into distinct groups having different fixes. Gradually, the clusters "thin" and it becomes apparent that the possibilities of representing two different cases of a certain fault is limited. As the clusters "thin", the selector means stops adding new cases for that particular cluster. An alternative to the clustering scheme, is to add cases that fail to be diagnosed and to remove new cases that are diagnosed. Another possibility, is for the selector means to remove cases that have not been matched in a long period of time.

The present invention has disclosed a method and system for analyzing error logs generated from a malfunctioning device. The error log analysis system includes means for storing a plurality of historical error logs generated from a plurality of malfunctioning devices. Each of the plurality of historical error logs contain data representative of events occurring at the plurality of malfunctioning devices. The plurality of historical error logs are grouped into case sets of common malfunctions. A receiving means receives a new error log from a malfunctioning device. The new error log contains data representative of events occurring at the malfunctioning device. A comparing means compares the new error log to the plurality of historical error logs. The comparing means locates sections of data in the new error log that are common to sections of data in each of the case sets defined from the plurality of historical error logs. A predicting means predicts which of the common sections of data are indicative of the malfunction.

It is therefore apparent that there has been provided in accordance with the present invention, a method and system for analyzing error logs generated from a malfunctioning device that fully satisfy the aims and advantages and objectives hereinbefore set forth. The invention as been described with reference to several embodiments. However, it will be appreciated that variations and modification can be effected by a person of ordinary skill in the art without departing from the scope of the invention.

We claim:

1. An error log analysis system for analyzing an error log generated from a malfunctioning machine, comprising:

means for storing a plurality of historical error logs generated from a plurality of malfunctioning machines, each of the plurality of historical error logs containing data representative of events occurring at the plurality of malfunctioning machines during operation, the plurality of historical error logs being grouped into case sets of common malfunctions;

means for receiving a new error log from a malfunctioning machine, the new error log containing data representative of events occurring at the malfunctioning machine during operation;

means for comparing the new error log to the plurality of historical error logs, the comparing means locating sections of data in the new error log that are common to sections of data in each of the case sets defined for the plurality of historical error logs, the comparing means comprising block finding means for finding the common sections of data between each of the case sets in the plurality of historical error logs, the common sections of data being identified as blocks; and means for predicting which of the common sections of data are indicative of the malfunction.

2. The error log analysis system according to claim 1, further comprising means for formatting the new error log and the plurality of historical error logs into a suitable format.

3. The error log analysis system according to claim 2, wherein the formatting means comprises means for parsing non-essential data from the error logs.

4. The error log analysis system according to claim 3, wherein the formatting means comprises means for columnizing the parsed data into a columnized format.

5. The error log analysis system according to claim 1, further comprising means for storing the blocks of data.

6. The error log analysis system according to claim 1, further comprising a block matching unit for matching blocks of data from the new error log to the blocks stored in the storing means.

7. The error log analysis system according to claim 1, wherein the predicting means further comprises weighting means for assigning a numerical weight to each of the located common sections of data, the weight being a measure of fault contribution to the malfunction.

8. The error log analysis system according to claim 7, wherein the weighting means includes a weighted history chart, wherein each block is arranged in case sets listed with a weight value, blocks having a higher instance of occurrence in the case sets being assigned a lower weight value and blocks having a lower instance of occurrence in the case sets being assigned a higher weight value.

9. The error log analysis system according to claim 8, wherein the weighting means uses an exponential weighting scheme.

10. The error log analysis system according to claim 8, further comprising means for determining an index of similarity between the new error log and the weighted blocks, the similarity index being a measure of similarity between the new error log to the blocks in the weighted history chart.

11. The error log analysis system according to claim 10, wherein the determining means generates a high similarity index for blocks with a close match and a low similarity index for blocks with a bad match.

12. An error log analysis system for analyzing an error log generated from a medical imaging device, comprising:

means for storing a plurality of historical error logs generated from a plurality of medical imaging devices, each of the plurality of historical error logs containing data representative of events occurring at the plurality of medical imaging devices, the plurality of historical error logs being grouped into case sets of common malfunctions;

means for receiving a new error log from a malfunctioning medical imaging device, the new error log containing data representative of events occurring at the malfunctioning medical imaging device;

means for comparing the new error log to the plurality of historical error logs, the comparing means locating sections of data in the new error log that are common to sections of data in each of the case sets defined from the plurality of historical error logs, the comparing means comprising block finding means for finding the common sections of data between each of the case sets in the plurality of historical error logs, the common sections being identified as blocks;

means for assigning a weight to each of the identified blocks of data, the weight being a measure of fault contribution to the malfunction; and means for determining an index of similarity between the new error log and the weighted blocks, the similarity index being a measure of how similar the new error log is to the weighted blocks and being used to appropriate fault contribution.

13. A method for analyzing an error log generated from a malfunctioning device, comprising the steps of:

storing a plurality of historical error logs generated from a plurality of malfunctioning devices, each of the plurality of historical error logs containing data representative of events occurring at the plurality of malfunctioning devices, the plurality of historical error logs being grouped into case sets of common malfunctions;

receiving a new error log from a malfunctioning device, the new error log containing data representative of events occurring at the malfunctioning device;

comparing the new error log to the plurality of historical error logs;

locating sections of data in the new error log that are common to sections of data in each of the case sets defined from the plurality of historical error logs, the step of locating comprising finding common sections of data between each of the case sets in the plurality of historical error logs, the common sections of data being identified as blocks; and determining which of the common sections of data are causing a fault at the malfunctioning device.

14. The method of analyzing an error log according to claim 13, further comprising the step of formatting the new error log and the plurality of historical error logs into a suitable format.

15. The method of analyzing an error log according to claim 14, further comprising the step of parsing essential data from the error logs.

16. The method of analyzing an error log according to claim 15, further comprising the step of columnizing the parsed data into a columnized format.

17. The method of analyzing an error log according to claim 13, further comprising the step of storing the blocks of data.

18. The method of analyzing an error log according to claim 17, further comprising the step of matching blocks of data from the new error log to the stored blocks.

19. The method of analyzing an error log according to claim 13, further comprising the step of assigning a weight to each of the located common sections of data, the weight being a measure of fault contribution to the malfunction.

20. The method of analyzing an error log according to claim 19, wherein the step of assigning a weight includes forming a weighted history chart, wherein each block and their occurrences in case sets is listed with a weight value, blocks having a higher instance of occurrence being assigned a lower weight value and blocks with a lower instance of occurrence being assigned a higher weight value.

21. The method of analyzing an error log according to claim 20, further comprises the step of determining an index of similarity between the new error log and the weighted blocks, the similarity index being a measure of how similar the new error log is to the blocks in the weighted history chart.

22. A method of analyzing an error log generated from a medical imaging device, comprising:

storing a plurality of historical error logs generated from a plurality of medical imaging devices, each of the plurality of historical error logs containing data representative of events occurring at the plurality of medical imaging devices, the plurality of historical error logs being grouped into case sets of common malfunctions;

receiving a new error log from a malfunctioning medical imaging device, the new error log containing data representative of events occurring at the malfunctioning medical imaging device;

comparing the new error log to the plurality of historical error logs;

locating sections of data in the new error log that are common to sections of data in each of the case sets defined from the plurality of historical error logs, the step of locating comprising finding common sections of data between each of the case sets in the plurality of historical error logs, the common sections of data being identified as blocks;

assigning a weight to each of the identified blocks of data, the weight being a measure of fault contribution; and determining an index of similarity between the new error log and the weighted blocks, the similarity index being a measure of how similar the new error log is to the weighted blocks and being used to appropriate fault contribution.

* * * * *